United States Patent [19]

Shimokawa

[11] Patent Number: 4,615,076

[45] Date of Patent: Oct. 7, 1986

[54] KNEADED FOOD MOLDING APPARATUS OF THE ROTARY TYPE

[75] Inventor: Katsusuke Shimokawa, Moriguchi, Japan

[73] Assignee: Sun Plant Industry Co., Ltd., Osaka, Japan

[21] Appl. No.: 689,961

[22] Filed: Jan. 9, 1985

Related U.S. Application Data

[63] Continuation-in-part of Ser. No. 482,717, Apr. 7, 1983, abandoned.

[30] Foreign Application Priority Data

Jun. 18, 1982 [JP] Japan ................................. 57-105851

[51] Int. Cl.⁴ ............................................... A22C 7/00
[52] U.S. Cl. ........................................ 17/32; 425/420; 425/424; 426/513
[58] Field of Search .................... 17/32; 426/513, 516, 426/512; 425/420, 422, 424, 436 R, 437

[56] References Cited

U.S. PATENT DOCUMENTS

| 1,757,447 | 5/1930 | Comstock | 17/32 |
| 1,892,779 | 1/1933 | Cole | 17/32 |
| 2,324,202 | 7/1943 | Felton | 17/32 |
| 4,138,768 | 2/1979 | Roth | 17/32 |

FOREIGN PATENT DOCUMENTS 467922 6/1937 United Kingdom ................... 17/32

Primary Examiner—Willie G. Abercrombie
Attorney, Agent, or Firm—Birch, Stewart, Kolasch & Birch

[57] ABSTRACT

A kneaded food molding apparatus of the rotary type comprising a rotary plate to which a plurality of molding devices are attached, a stationary shaft to which the rotary plate is secured in a manner rotatable around the center of the rotary plate, a drive mechanism for intermittently rotating the rotary plate, and an actuating mechanism for actuating the molding device, the actuating mechanism being mounted to a fan-shape support plate located above the rotary plate and secured to the stationary shaft. According to the intermittent rotation of the rotary plate, the actuating mechanism actuates the molding device to automatically and continuously mold kneading food, such as hamburgers or croquettes, without lack or sticking of portions of the kneaded food to the molding device.

2 Claims, 6 Drawing Figures

KNEADED FOOD MOLDING APPARATUS OF THE ROTARY TYPE

CROSS-REFERENCE TO RELATED APPLICATION

This application is a continuation-in-part of application Ser. No. 482,717, filed Apr. 7, 1983, and abandoned upon the filing of this application.

BACKGROUND OF THE INVENTION

The present invention relates to a kneaded food molding apparatus of the rotary type for automatically and continuously molding kneaded food such as croquettes or hamburgers.

Kneaded food such as croquettes or hamburgers may be charged to molds and then molded. When removing such food from the molds, the foods partially sticks to an extruding means so that the molded food as removed from the molds disadvantageously lacks a portion thereof.

In order to resolve such inconvenience, co-pending patent application U.S. Ser. No. 482,717, now abandoned, disclosed a method and apparatus of extruding kneaded food comprising a cylindrical hollow mold member, an intermediate cylindrical member engaged with the hollow mold member at its hollow portion and having in the inner surface longitudinal grooves extending from the top to the vicinity of the lower end of an intermediate cylindrical member, and an actuating shaft member.

According to the molding means of this invention above-mentioned, the intermediate hollow member is inserted into the hollow mold member, and the actuating shaft member is inserted into the intermediate hollow member. The actuating shaft member and the intermediate cylindrical member inserted into the hollow mold member, are lifted up to form a molding space for kneaded food in the hollow mold member. Such molding space is charged with kneaded food. The intermediate cylindrical member and the actuating shaft member are then lowered to extrude the molded food from the hollow mold member. The actuating shaft member is lifted up from the intermediate cylindrical member to a position slightly lower than the lower ends of the longitudinal grooves, thereby to form a vacuum portion. The actuating shaft member is further lifted up such that air is sucked to the vacuum portion through the longitudinal grooves. The actuating shaft member which has been lifted up, is then lowered to compress the sucked air, so that the molded food sticking to the lower surface of the intermediate cylindrical member is disengaged by the compressed air pressure.

According to the invention in the application above-mentioned, the molding means is attached to a mold plate for molding kneaded food. That is, the mold plate has one hole to which the molding means discussed hereinbefore is attached. By an actuating mechanism, this mold plate is horizontally reciprocated for molding kneaded food such as hamburgers or croquettes. However, one reciprocal movement of the mold plate provides only one molded product. This disadvantageously presents a low productivity.

It is therefore proposed to form in the mold plate a plurality of holes to which a plurality of molding means are attached, thus improving the productivity. In such a case, however, a large-size mold plate has to be used according to the number of the holes. In addition, the arrangement of reciprocating movement requires a further large space as compared with the mold plate having one hole.

Moreover, where a plurality of holes are formed, a plurality of kneaded food supply ports are required; otherwise, the productivity cannot be improved as compared with the mold plate having one hole to which one molding means is attached. Accordingly, at least one additional kneaded food supply port is therefore required and thus additional kneaded food supply devices are required.

SUMMARY OF THE INVENTION

In view of the foregoing, the present invention is proposed to provide a kneaded food molding apparatus of the rotary type capable of improving the productivity in a limited space with the use of only one kneaded food supply device, in which molding means are efficiently charged with kneaded food.

The kneaded food molding apparatus of the rotary type in accordance with the present invention includes a molding means 4 having a hollow mold member 24, an intermediate cylindrical member 25 to be engaged with the hollow portion of the hollow mold member 24 and having a longitudinal groove 31 in its inner surface, and an actuating shaft member 26 to be engaged with the intermediate cylindrical member 25 and having an actuating mechanism 27 thereon.

Rotatably attached to a stationary shaft 7 is a rotary plate 3 having in the peripheral portion thereof a plurality of holes 23, in which the molding means are attached. There is provided a drive mechanism for rotating the rotary plate 3. A support member 39 supports an actuating mechanism 5 for actuating the intermediate cylindrical members 25 and the actuating shaft members 26 of the molding means 4 by the rotation of the rotary plate 3. This support member 39 is located above the rotary plate 3 and secured to the stationary shaft 7.

The rotary plate 3 to which the molding means 4 are mounted, is intermittently rotated by the drive mechanism. The rotary plate 3 temporarily stops rotating at a predetermined position where kneaded food is to be supplied to the molding means 4. At such a position, kneaded food is supplied into the molding means 4. Upon the completion of such supply, the rotary plate 3 is again rotated to move the molding means 4. With such movement, the actuating mechanism 5, attached to the support member 39 above the rotary plate 3, actuates the intermediate cylindrical member 25 and the actuating shaft member 26 of the molding means 4. After having been rotated by a predetermined angle, the rotary plate 3 is again stopped and molded food in the molding means is pushed down by a member constituting the actuating mechanism.

When one molding means 4 is located at the molded food extruding position, another molding means 4 on the rotary plate 3 is located at the kneaded food supply position. One molding means is charged with kneaded food while another molding means is subjected to the extrusion process. Such operation is repeated to continuously perform automatic molding of kneaded food.

DETAILED DESCRIPTION OF THE PREFERRED EMBODIMENT

The description hereinafter will discuss an embodiment of the present invention with reference to the accompanying drawings.

Figure 1:
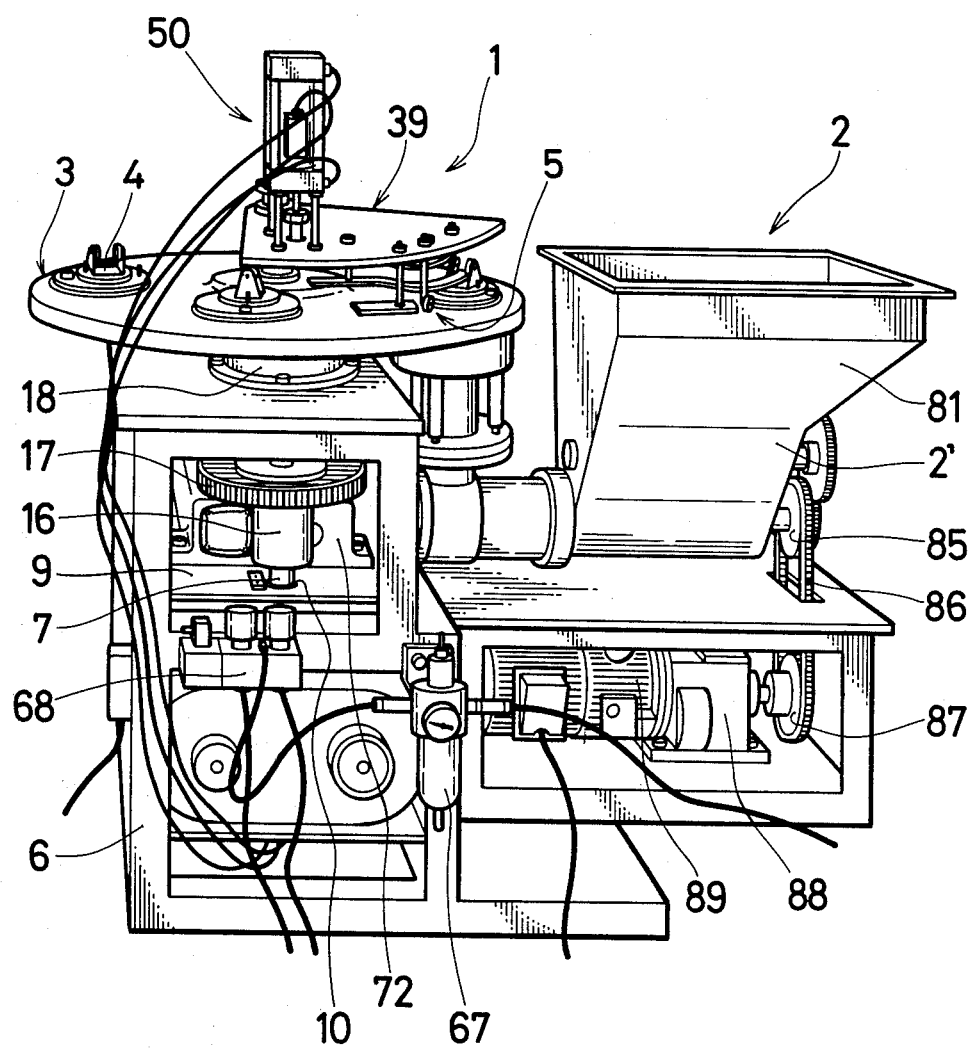
FIG. 1 is a general perspective view in front elevation of an embodiment of the present invention.
Figure 2:
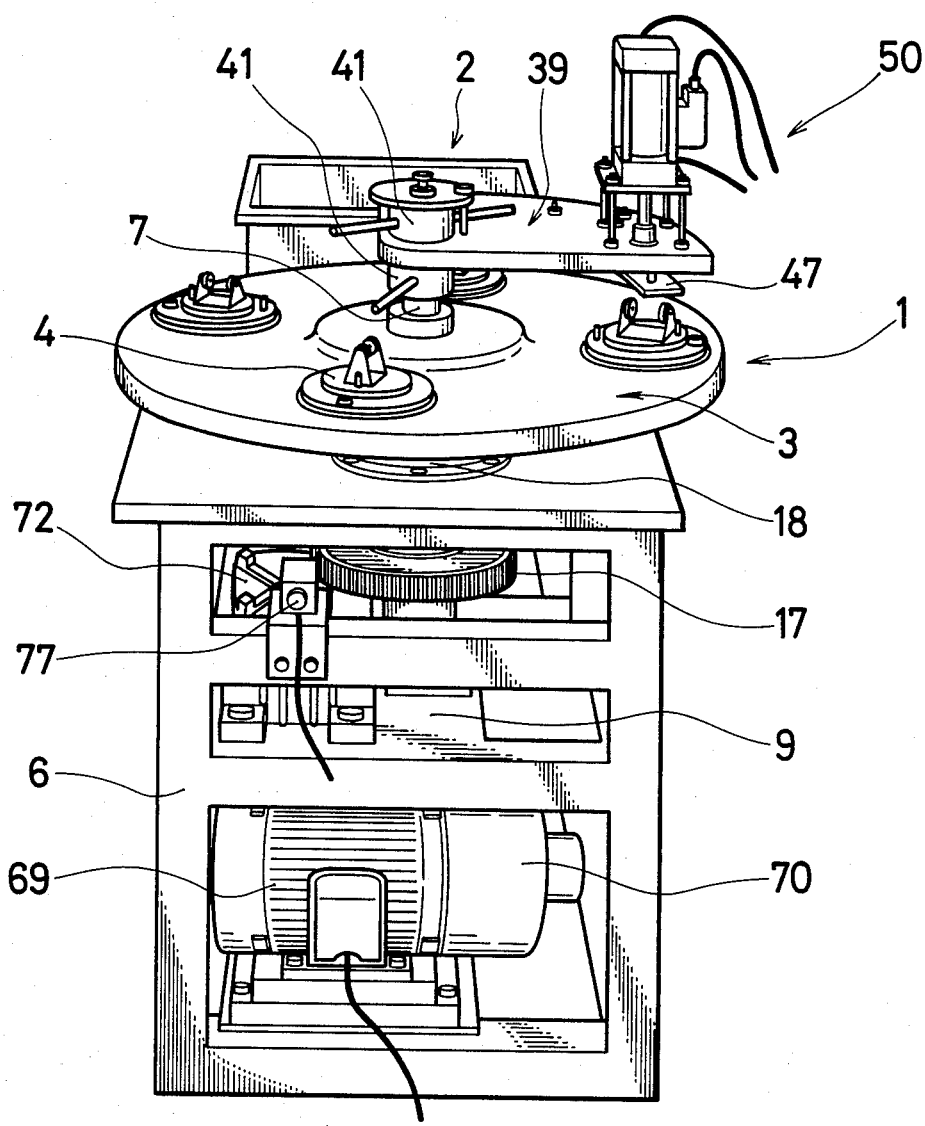
FIG. 2 is a perspective view in left side elevation of FIG. 1.

FIGS. 1 and 2 illustrate a kneaded food molding apparatus of the rotary type 1 in accordance with the present invention and a kneaded food supply device 2 for supplying kneaded food made of meat or the like.

In this embodiment, a screw feeder 2' is used as the kneaded food supply device 2. In the kneaded food molding apparatus of the rotary type 1, molding means 4 including members to be discussed later, are attached to a rotary plate 3, and a drive mechanism is disposed for intermittently rotating the rotary plate 3. On the rotary plate 3, an actuating mechanism 5 is disposed for actuating in succession the members of the molding means 4 such that kneaded food is automatically molded.

The following description will discuss in detail the kneaded food molding apparatus of the rotary type 1.

Figure 3:
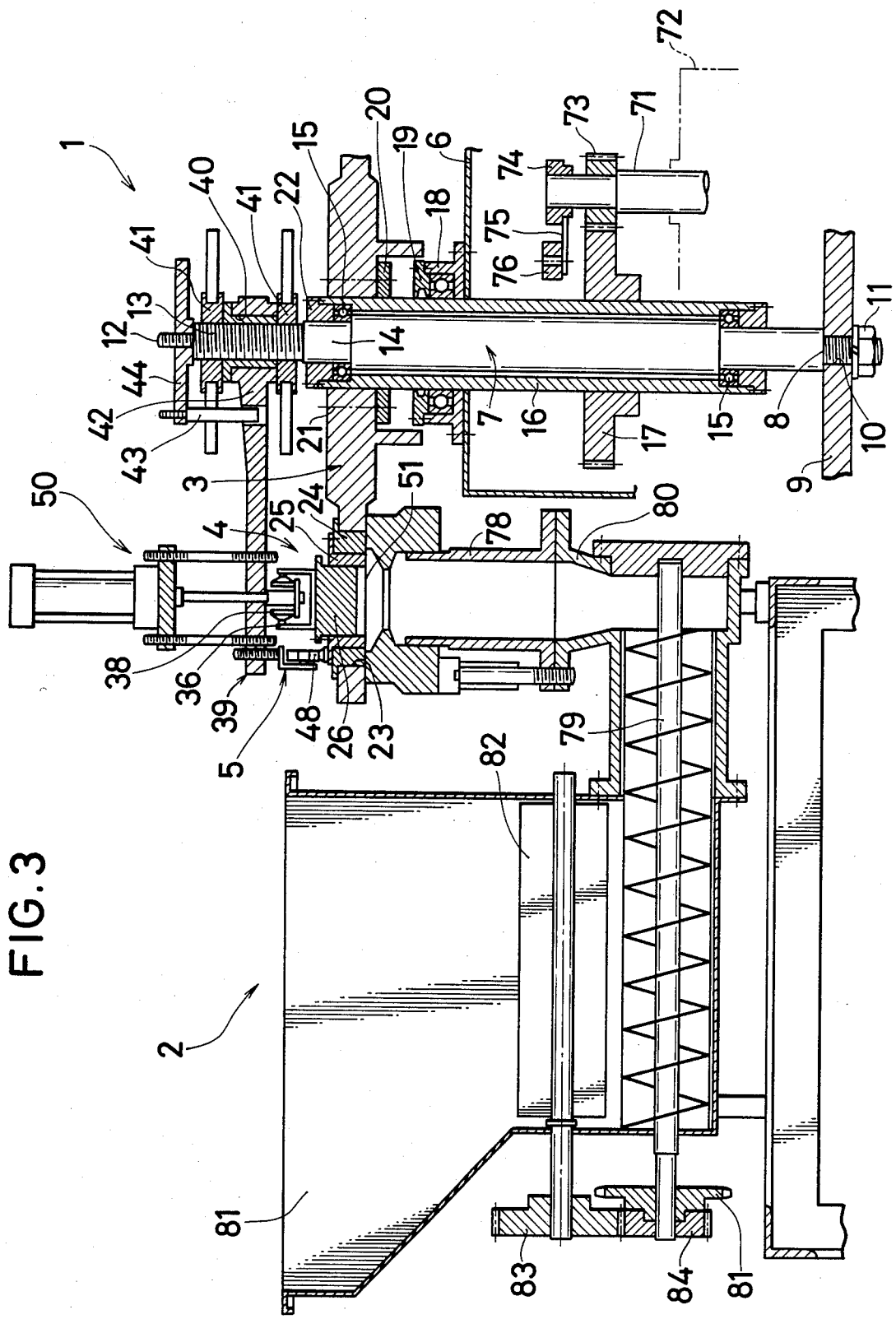
FIG. 3 is a section view of main portions of FIG. 1.
Figure 4:
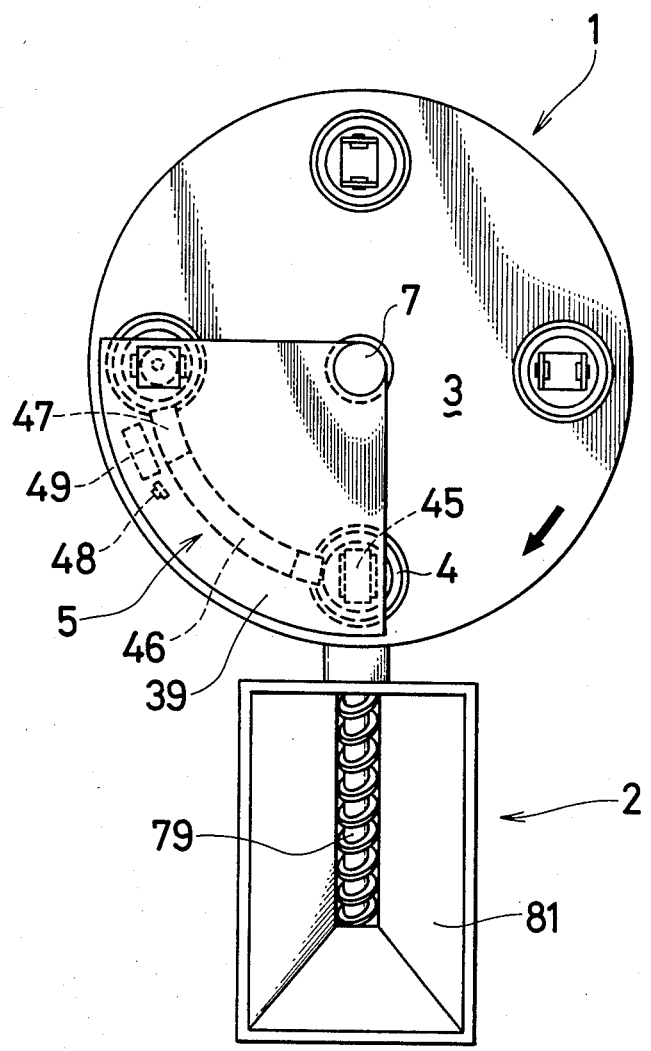
FIG. 4 is a plan view of FIG. 1.

As shown in FIGS. 1-3, the members constituting the molding apparatus 1 are mounted on a frame 6. The frame 6 has at its center a stationary shaft 7 having a lower threaded end 8 having a smaller outer diameter. This threaded portion is inserted in an hole 10 in a stationary member 9 transversely disposed in the intermediate portion of the frame 6. A nut 11 is attached to the portion of the threaded end 8 projecting from the hole 10, thereby fixing the stationary shaft 7 to the stationary member 9.

The stationary shaft 7 has an upper end of three stages, a tip 12, an intermediate portion 13 and a shank 14 respectively having three different diameters reduced in the upward direction. The tip 12 and the intermediate portion 13 are threaded.

Bearings 15 are fitted on the stationary shaft 7 at its shank 14 and its portion located upward with respect to the stationary member 9. Through these bearings 15, a cylindrical rotary shaft 16 is put on the stationary shaft 7. A cover is generally designated by a numeral 22. The rotary shaft 16 has such length as to cover the stationary shaft 7 at its large diameter portion between the position slightly upward with respect to the stationary member 9 and the position adjacent the upper end of the shank 14.

A gear wheel 17 is fitted to the rotary shaft 16 adjacent its lower end. This gear wheel 17 is adapted to be coupled to a drive mechanism to be discussed later for transmitting a rotary power to the rotary shaft 16. The rotary shaft 16 is supported by an angle flange unit 18. A seal is generally designated by a numeral 19.

A flange 20 is attached to the rotary shaft 16 adjacent its upper portion. The rotary plate 3 as placed on the flange 20 is fitted on the rotary shaft 16. The rotary plate 3 is secured to the flange 20 with bolts 21. The rotary plate 3 is made of a circular plate having a few cm and has in its periphery four holes 23 angularly spaced by 90° from one another around the stationary shaft 7. Molding means 4 are respectively attached to these holes 23.

Figure 5:
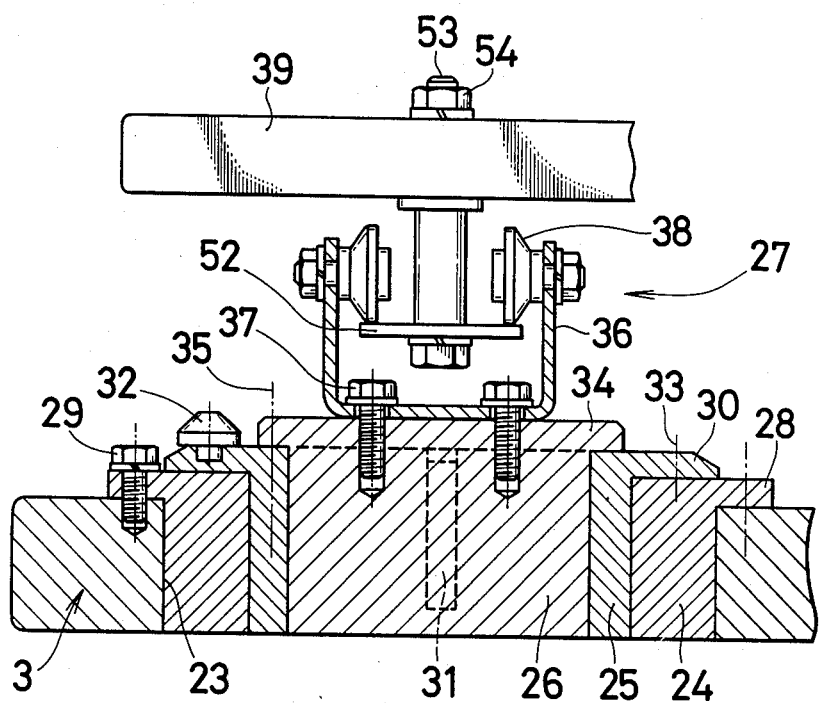
FIG. 5 is a section view of the molding means.

As shown in FIG. 5, each of the molding means 4 includes a combination member made of Teflon having a hollow mold member 24, an intermediate member 25, an actuating shaft member 26, and an actuating mechanism 27 disposed above the actuating shaft member 26.

Each of the hollow mold members 24 is cylindrical and has a flange 28 at its upper end. The length of the cylindrical portion of the mold member 24, except for the flange 28, is equal to the thickness of the rotary plate 3. This hollow mold member 24 is inserted in the hole 23 of the rotary plate 3 with the flange 28 turned upward, and is secured to the rotary plate 3 with bolts 29.

The intermediate cylindrical member 25 is slidably fitted in the hollow mold member 24 and has a flange 30 at its upper end. This intermediate member 25 has at least one longitudinal groove 31 extending from its upper end to a portion adjacent its lower end. Formed on the flange 30 is a protuberance 32 adapted to come in contact with the actuating mechanism 5 to be discussed later. The length of the cylindrical portion of the intermediate cylindrical member 25 excluding the flange 30 is equal to the entire height of the hollow mold member 24. The intermediate cylindrical member 25 is set to be vertically movable but not rotatable by means of a rotation preventive pin 33.

The actuating shaft member 26 is a round shaft having a flange 34 at the upper end thereof and is slidably fitted in the intermediate cylindrical member 25. The length of the actuating shaft member 26 excluding the flange 34 is equal to the entire height of the intermediate cylindrical member 25. A rotation preventive pin 35 similar to the pin 33 is put in the flange 34 so that the actuating shaft member 26 is set to be vertically movable and not rotatable.

An actuating mechanism 27 disposed on the actuating shaft member 26 comprises a U-shape bracket 36, bolts 37 for attaching the bracket 36 to the actuating shaft member 26, and engagement rollers 38. The engagement rollers 38 are faced to each other and rotatably disposed or attached inside of the upper portions of the U-shape bracket.

There is disposed a support member 39 to which is attached the actuating mechanism 5 for operating the constituting members of the molding means 4. As shown in FIGS. 1-4, the support member 39 is made of a fan-shape plate having an angle of 90° and a thickness of 15 mm-20 mm. The support member 39 is supported by the stationary shaft 7. As shown in FIG. 3, the medial base portion 42 of the support member 39 has a thickness greater than that of the lateral tip portion thereof. The support member 39 has in the base portion 42 a hole 40 in which the intermediate portion 13 of the stationary shaft 7 is fitted through a sleeve. The base portion 42 is vertically held by and between fastening means 41 to secure the support member 39 to the stationary shaft 7. The fastening means 41 are threadedly connected to the intermediate portion 13 of the stationary shaft 7. Rotation of the fastening means 41 provides vertical movement thereof. By such movement, the entire support members 39 may be vertically movable, thus permitting adjusting of the thickness of the kneaded food molded by the molding means 4.

The support member 39 is fixed to a predetermined position in order to prevent its positional shift. With one end of the fan-shape support member 39 located adjacent a supply port 51 of the kneaded food supply device 2, the support member 39 is fixed, through a rotation preventive pin 43, to an end plate 44 threadedly connected to the tip portion 12 of the stationary shaft 7.

An actuating mechanism 5 for operating the respective constituting members of the molding means 4 is attached beneath the support member 39 along its arcuate periphery at its under and top surfaces.

Figure 6:
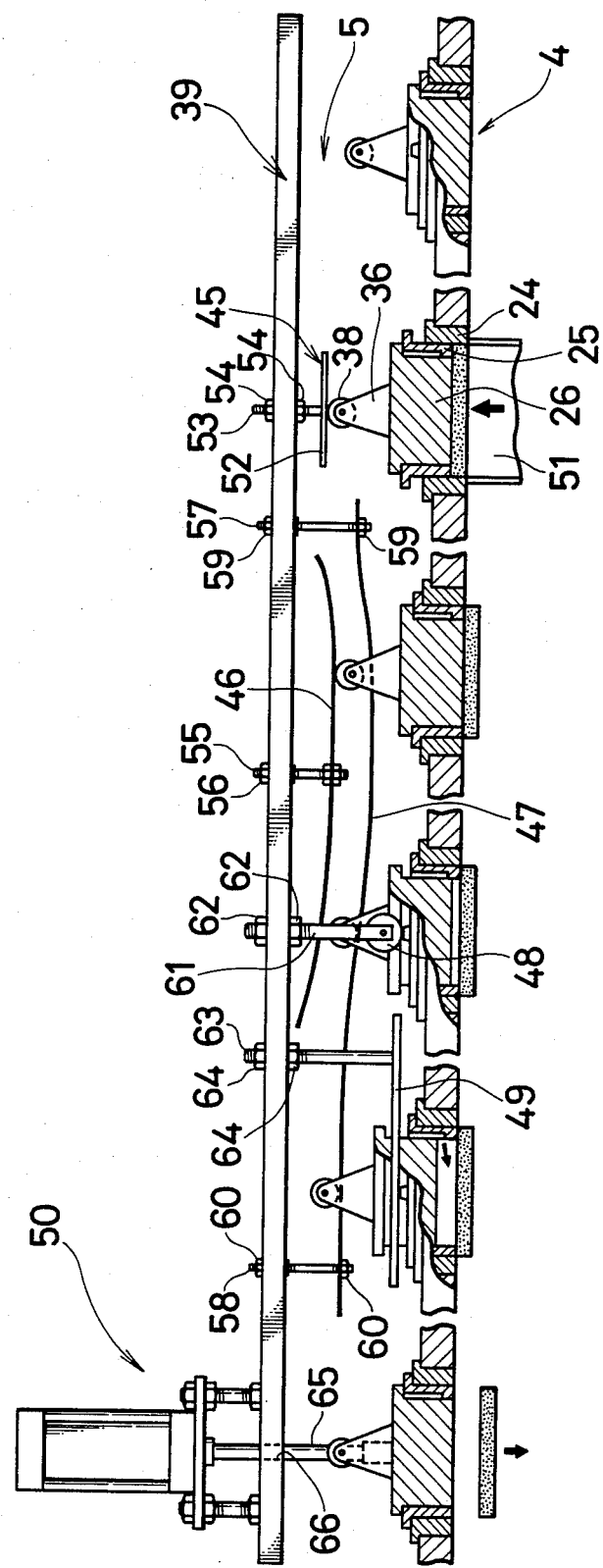
FIG. 6 is a view continuously illustrating how the molding means are operated at respective positions of the actuating mechanism.

A description will now be made in detail of the actuating mechanism 5 with reference to FIG. 6.

The actuating mechanism 5 has a thickness adjusting stopper 45, an upper guide plate 46, a lower guide plate 47, a push-down roller 48, a push-down maintaining plate 49 and a molded food extruding means 50. These members of the actuating mechanism 5 are disposed in the direction from one end of the support member 39 adjacent the supply port 51 to the other end thereof.

The thickness adjusting stopper 45 is disposed above the supply port 51. This stopper 45 includes a stopper plate 52, a threaded rod 53 and a nut 54. When the actuating shaft member 26 of the molding means 4 is lifted up, the stopper 45 is engaged with the engagement rollers 38 attached to the actuating shaft member 26 through the bracket 36. The stopper plate 52 to come in contact with the engagement roller 38 is attached, in a vertically adjustable manner, to the support member 39 through the threaded rod 53. By vertical adjustment of the threaded rod 53, the thickness of the molded food such as a hamburger molded in the molding means 4 may be finely adjusted, in addition to adjustment by the vertical movement of the support member 39 by the fastening means 41.

The upper guide plate 46 and the lower guide plate 47 are then attached to the support member 39. The upper guide plate 46 is a band-shape downwardly curved plate and is attached, in a vertically adjustable manner, to the support member 39 with a threaded rod 55 and a nut 56. This upper guide plate 46 extends from the vicinity of one end 45 of the stopper plate 52 to the vicinity of the push-down maintaining plate 49 to be discussed later.

The lower guide plate 47 is attached to the support member 39 substantially in parallel with and under the upper guide plate 46 with a desired distance provided therebetween. The lower guide plate 47 is made of a downwardly curved plate along the curved upper guide plate 46. The portion of the lower guide plate 47 located between the front end of the push-down maintaining plate 49 and the molded food extruding means 50, is made horizontal. This plate 47 is attached, at its both ends and center portion, to the support member 39 with bolts 57, 58 and nuts 59, 60, such that the plate 47 is vertically adjustable.

The push-down roller 48 is disposed at a position where the top surface of the lower guide plate 47 comes in contact with the engagement rollers 38 of the molding means 4. The push-down roller 48 is attached to the support member 39 with a nut 62 through a threaded rod 61 on this side of the rear end of the upper guide plate 46 at a position located outwardly of the mounting positions of the upper and lower guide plates 46 and 47 to the support member 39 and at a position to come in contact with the protuberance 32 of the intermediate cylindrical member 25 of the molding means 4. The roller 48 is set to be vertically adjustable.

The push-down maintaining plate 49 is then disposed subsequent to the push-down roller 48. The push-down maintaining plate 49 is made of a band-shape plate and attached, in a vertically adjustable manner, to the support plate 39 with a nut 64.

The push-down roller 48 is disposed for preventing the intermediate cylindrical member 25 from being lifted up with a rise of the actuating shaft member 26. In order to continuously hold such a state, the push-down maintaining plate 49 is attached to the support member 39 on the same circumferential line on which the push-down roller 48 is attached to the support member 39.

The molded food extruding means 50 is disposed on the support member 39 adjacent the rear end thereof. In this embodiment, a pneumatic pressure cylinder is used as the molded food extruding means 50. The pneumatic pressure cylinder is attached to the support member 39 such that, by rotation of the rotary plate 3, the actuating shaft member 26 of the molding means 4 is moved just below a rod 65 of the cylinder 50. The rod 65 passes through a hole 66 in the support member 39 and downwardly projects therefrom. A rubber member is attached to the tip of the rod 65 for softening a shock developed when the rod 65 strikes the actuating shaft member 26. In FIG. 1, a pressure reduction valve 67 and an electromagnetic changeover valve 68 are connected to the cylinder 50 through connection tubes.

The following description will discuss the drive mechanism for driving the rotary plate 3 to which molding means 4 are attached, with reference to FIGS. 1 to 3.

The drive mechanism includes a motor 69, a stepless speed change gear 70, a speed reduction gear, clutch means and a brake, which are all mounted to the frame 6. The frame 6 is vertically divided into two portions. Disposed in the lower portion of the frame 6 are the motor 69, the stepless speed change gear 70, the speed reduction gear, the clutch means, and the brake ( not shown ). The motor 69 and the speed reduction gear are arranged in parallel and connected to each other through the clutch means, the brake and the stepless speed change gear 70.

The output shaft 71 of the speed reduction gear is displaced by 90° in the power transmission direction with respect to its input shaft. This reduction gear output shaft 71 is supported by a casing 72 located in the upper portion of the frame 6. Fitted on the output shaft 71 is a pinion 73 to be meshed with the gear wheel 17. The teeth ratio of the gear wheel 17 to the pinion 73 is 4:1. One rotation of the pinion 73 therefore causes the gear wheel 17 to be rotated by a ¼ rotation, so that the rotary plate 3 disposed through the rotary shaft 16 is also rotated by a ¼ rotation.

A holding member 74 is fitted on the tip of the output shaft 71 projecting from the pinion 73. A roller 76 is rotatably attached to the holding member 75 through a coupling rod 75. A limit switch 77 is attached to the frame 6 such that the roller 76 comes in contact with the actuator of the limit switch 77 by rotation of the output shaft 71. The kneaded food molding apparatus of the rotary type 1 in accordance with the present invention is constructed as discussed hereinbefore.

In the screw feeder 2' used as a kneaded food supply device 2, its portion forming the supply port 51 and closely contacted with the under surface of the support member 39 is made of nylon (FIG. 3). The supply port 51 is connected, through a connection tube 78, to a casing 80 of a kneaded food feed screw 79 at right angle to the axial direction of the screw 79.

There is disposed a hopper 81 into which kneaded food is thrown. An agitating blade 82 has a gear 83 with which a gear 84 for the screw 79 is meshed, so that the blade 82 is rotated together with the screw 79. As shown in FIG. 1, the screw 79 is connected to the motor 89 through a sprocket 85, a chain 86, a sprocket 87 and a speed reduction gear 88.

The following description will discuss how the kneaded food molding apparatus of the rotary type in accordance with the present invention is operated with reference to FIGS. 1 to 6.

The rotary plate 3 to which the molding means 4 are attached, is rotated by the motor 69. The screw feeder 2' for supplying kneaded food to the molding means 4 is driven by the motor 89 to pressingly supply kneaded food to the side of the rotary plate 3 through the supply port 51. The rotary plate 3 is thus rotated, and the following operations are subsequently made in succession.

The roller 76 attached, through the holding member 74 and the coupling rod 75, to the output shaft 71 of the drive mechanism for rotating the rotary plate 3, actuates the actuator of the limit switch 77 mounted on the frame 6. Under electric control, the brake and clutch means are actuated and the rotary plate 3 is stopped rotating for a period of time preset by a timer.

When the rotary plate 3 is stopped rotating, a first molding means 4 is located on the supply port 51 of the screw feeder 2'. Kneaded food is then supplied to the hollow mold member 24 of said first molding means 4 through the supply port 51. The pressure produced by such food supply causes the intermediate cylindrical member 25 and the actuating shaft member 26 of the first molding means 4 to be pushed upward. The engagement rollers 38 disposed on the actuating shaft member 26 through the bracket 36, come in contact with the stopper plate 52 of the thickness adjusting stopper 45 above the rollers 38, thereby stopping a rise of the intermediate cylindrical member 25 and the actuating shaft member 26. During such operation, the rotary plate 3 remains stationary by the timer set.

Upon the completion of supply of kneaded food to the first molding means 4, the brake and clutch means under electric control are operated and the rotary plate 3 is again rotated. By such rotation, the engagement rollers 38 gradually come in contact with the under surface of the downwardly curved upper guide plate 46. The actuating shaft member 26 and the intermediate cylindrical member 25 are then pushed down. The kneaded food in the first molding means 4 is pushed out as molded. Thus molded food remains stuck to the bottom surfaces of the intermediate cylindrical member 25 and the actuating shaft member 26. With the molded food sticking to these bottom surfaces, the rotary plate 3 is continuously rotated. By such rotation, the engagement rollers 38 are gradually separated from the upper guide plate 46 and come in contact with the top surface of the lower guide plate 47. The engagement rollers 38 in contact with the lower guide plate 47, are lifted up along the upward inclination of the lower guide plate 47. The actuating shaft member 26 connected to the engagement rollers 38 through the bracket 36, is again lifted up.

At this time, the protuberance 32 of the intermediate cylindrical member 25 comes in contact with the push-down roller 48, so as to prevent a rise of the intermediate cylindrical member 25 closely fitted on the actuating shaft member 26. The actuating shaft member 26 is further lifted up as guided by the lower guide plate 47. At this time, through the longitudinal groove 31 air is sucked into a space between the molded food and the lower end of the actuating shaft member 26 in the first molding means 4. The intermediate cylindrical member 25 of which rise is prevented by the push-down roller 48, is continuously prevented from being lifted up, by the push-down maintaining plate 49.

When the first molding means 4 arrives at a position corresponding to the molded food extruding means 50, the roller 76 disposed at the output shaft 71 is rotated by one rotation to again actuate the actuator of the limit switch 77. The brake and clutch means are then actuated to stop the rotation of the rotary plate 3.

The cylinder 50 is then actuated to lower the rod 65, which strikes the actuating shaft member 26. The air sucked in the space between the molded food and the actuating shaft member 26, is therefore compressed. The molded food sticking to the annular bottom surface of the intermediate cylindrical member 25, is then pushed down onto a conveyor (not shown) disposed below.

When the first molding means 4 is located under the cylinder 50, a second molding means 4 attached to the rotary plate 3 next to the first molding means 4 is located above the supply port 51 of the screw feeder 2'. Simultaneously with the food extruding operation to the first molding means, kneaded food is supplied to the second molding means 4. The kneaded food molding apparatus in accordance with the present invention repeatedly performs a series of such operation.

It is to be noted that the present invention is not limited to the embodiment discussed hereinbefore, and three, five, six or more molding means 4 may be attached to the rotary plate 3. The molding means 4 may be modified in shape and size. The support member 39 may be formed in a semi-circular or circular shape, or a fan-shape having an angle other than 90°. The support member may be made as support rods for individually supporting the members constituting the actuating mechanism 5. The rotary plate 3 may be changed in thickness, taking the thickness of molded food into consideration. Modifications may also be made of the mechanism for intermittently rotating the rotary plate 3 or the method for controlling such intermittent rotation.

Four molding means 4 may be attached to the rotary plate 3 in a manner angularly spaced from each other by 90° around the stationary shaft, and three kneaded food supply devices may be disposed for three molding means except the position for the molded food extruding means 50, so that molded food having three different layers may be made.

As thus discussed hereinbefore, according to the present invention, a plurality of molding means are attached to a rotary plate, and, by intermittent rotation of the rotary plate in succession, molded food may be continuously made. As molded food is extruded from one molding means, kneaded food may be supplied to another molding means, thereby to greatly improve the productivity.

The apparatus in accordance with the present invention is of the rotary type, thus permitting to form the apparatus in a small and compact size as compared with apparatus of the reciprocating type. The space required for installation may be therefore reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A kneaded food molding apparatus of the rotary type comprising:

at least one molding means each of which includes a cylindrical hollow mold member with an inner surface, a hollow intermediate cylindrical member with an outer and inner surface slidably fitted into the hollow portion of said hollow mold member such that said outer surface of said intermediate member is in contact with said inner surface of said hollow mold member, said intermediate member having in said inner surface thereof at least one longitudinal groove, and a round actuating shaft member slidably fitted into the hollow portion of said intermediate cylindrical member, having attached thereon a first actuating mechanism;

a rotary plate having in the peripheral portion thereof a plurality of holes for mounting said at least one molding means;

a stationary shaft having a cylindrical rotary shaft supported by bearing means fitted on said stationary shaft for supporting said rotary plate in a manner such that said plate is rotatable around a center of said rotary plate; and a support member having a second actuating mechanism for actuating said intermediate cylindrical member and said actuating shaft member of said molding means by rotation of said rotary plate, said support member being located above said rotary plate and secured to said stationary shaft.

2. A kneaded food molding apparatus of the rotary type as set forth in claim 1, wherein said first actuating mechanism includes a U-shape bracket and engagement rollers rotatably disposed in a facing relationship inside each upper portion of said U-shape bracket, and said second actuating mechanism includes a thickness adjusting stopper, an upper guide plate and a lower guide plate both for guiding said engagement rollers, a push-down roller, a push-down maintaining plate and a molded food extruding means, whereby when said rotary plate is in a stopped state, pressure of kneaded food supplied into said cylindrical hollow mold member of one of said molding means pushes said hollow intermediate cylindrical member and said actuating shaft member of said one molding means upward until they come in contact with said thickness adjusting stopper and as said rotary plate rotates in a predetermined direction, said engagement rollers are pushed down by said upper guide plate, thereby lowering said intermediate cylindrical member and said actuating shaft member so as to push said kneaded food downward from said one molding means, said engagement rollers being lifted up by said lower guide plate to lift up said actuating shaft member, while said push-down roller and push-down maintaining plate prevent said intermediate cylindrical member from being lifted up, thereby sucking air through said at least one longitudinal groove in the inner surface of said intermediate cylindrical member such that when said one molding member is positioned under said molded food extruding means, said rotary plate stops rotating and said molded food extruding means strikes said actuating shaft member downward to lower said actuating shaft member to compress said air and extrude the molded food downward.

* * * * *